(12) United States Patent
Bohne

(10) Patent No.: US 6,433,511 B1
(45) Date of Patent: Aug. 13, 2002

(54) METHOD AND APPARATUS FOR MANUALLY RECONDITIONING A BATTERY WITHOUT A SWITCH

(75) Inventor: William C. Bohne, Lawrenceville, GA (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/929,956

(22) Filed: Aug. 15, 2001

(51) Int. Cl.[7] .................................................. H02J 7/00
(52) U.S. Cl. ......................................................... 320/131
(58) Field of Search .................................. 320/131, 137

(56) References Cited

U.S. PATENT DOCUMENTS 5,826,958 A * 10/1998 Avitan .......................... 320/131
5,982,146 A * 11/1999 Nguyen ....................... 320/131
6,163,131 A * 12/2000 Gartstein et al. ............ 320/118
6,239,578 B1 * 5/2001 Schnell et al. ............... 320/119

* cited by examiner

*Primary Examiner*—Gregory Toatley
(74) *Attorney, Agent, or Firm*—Philip H. Burrus, IV

(57) ABSTRACT

This invention includes an apparatus and method of initiating reconditioning of a rechargeable battery cell without an auxiliary mechanical switch. When a battery is inserted into the charger, the charger identifies the battery. The charger determines whether to charge or recondition the battery based upon factors like chemistry and prior usage. The charger then begins either a charge or reconditioning cycle and indicates such to the user. The user may override the charger's decision by removing the battery from the pocket, at which time the charger starts a window timer. If the battery is reinserted prior to the expiration of the window timer, the charger stops the charge or reconditioning cycle and begins the corresponding opposite, i.e. it stops charging and begins reconditioning, or it stops reconditioning and begins charging.

17 Claims, 2 Drawing Sheets

METHOD AND APPARATUS FOR MANUALLY RECONDITIONING A BATTERY WITHOUT A SWITCH

BACKGROUND

1. Technical Field

This invention relates generally to battery charging systems, and more specifically to systems that recondition batteries by discharging prior to charging.

2. Background Art

When a nickel-based rechargeable battery is placed in a charger before it is completely "dead", it will lose some of its capacity due to the "memory effect". In other words, if a battery is consistently partially discharged before recharging, the battery will "die" more and more quickly. In the worst case, a fully charged battery that originally lasted for four hours might die after only one hour.

This phenomenon is known as the memory effect, or voltage depression. It is particular to nickel chemistry batteries where the capacity, or in technical terms the "energy versus time curve", changes based upon discharge patterns. The good news is that the memory effect can be nearly eliminated by fully discharging the battery at a nominal current. This type of full discharge is called "reconditioning".

To keep a battery at original capacity, the battery needs to be reconditioned whenever the discharge time, i.e. the usable time of the battery, has become reduced. However, it is not always clear to the user when reconditioning is needed. Some chargers make the decision for the user. For example, U.S. Pat. No. 5,942,878, issued to Ito, entitled "Method and Device for Reducing Memory Effect of a Battery", discloses one such charging system. The charger reconditions the battery every Nth charge depending upon usage.

The problem with these battery systems is that they sometime choose to recondition the battery when it is inconvenient for the user. For example, when the user is in a hurry and wants to charge the battery quickly for a special event, he will become frustrated when the charger starts a reconditioning cycle, thereby doubling the charge time. Likewise, if the user wants to recondition his battery right now, he may be frustrated when the charger does not think the time is appropriate.

Manufacturers have tried to overcome this problem by incorporating manual recondition switches in the chargers. For example, the 100-Watt 4 Station charger manufactured by ESI Technology includes a Mode Selector Switch that selects between charge and recondition modes.

The problem with mechanical switches is that they add cost to the end product. Additionally, they are mechanical parts that may fail after repeated use. There is thus a need for an improved method and apparatus for initiating reconditioning of batteries.

DETAILED DESCRIPTION OF THE INVENTION

Figure 1:
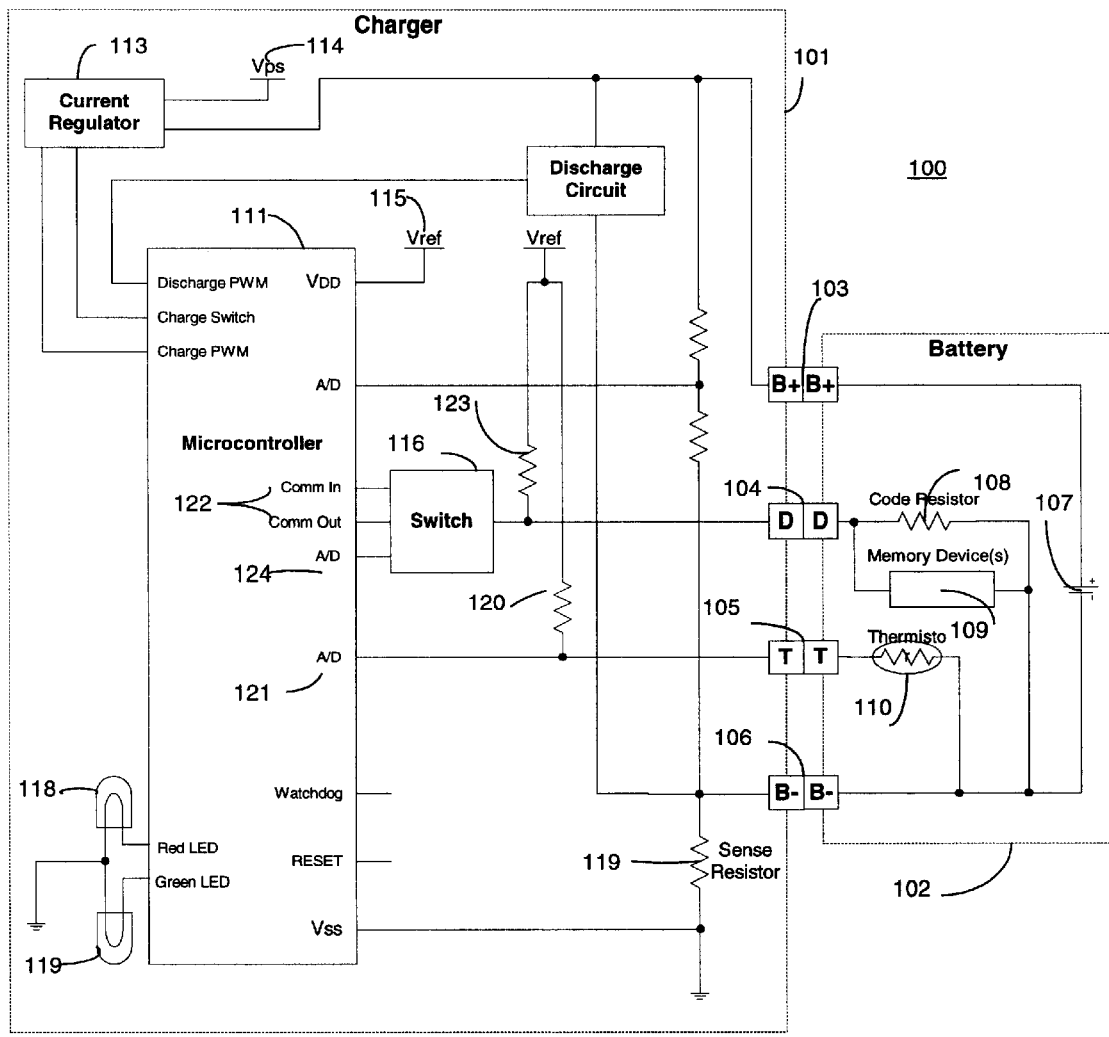
FIG. 1 is a schematic block diagram of a preferred embodiment of the invention.

A preferred embodiment of the invention is now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on."

This invention includes a method and apparatus that allow a user to manually initiate or terminate a battery reconditioning process without the need of a mechanical switch coupled to the charger. The lack of need for a switch reduces both the mechanical complexity of the invention and the cost.

Referring now to FIG. 1, illustrated therein is a schematic block diagram of a preferred embodiment in accordance with the invention. A battery 102 having at least one rechargeable cell 107 is shown coupled to a charger 101 having a microprocessor 111 disposed within. The coupling is achieved through mating contacts Battery+103, Data 104, Thermistor 105 and Battery−106.

The battery 102 also contains a thermistor 110 for sensing the temperature of the cell, an optional code resistor 108 which has an impedance that corresponds to a particular cell, and a memory device 109 that holds battery information, including serial number, type of cell, charging instructions, data parameters, charge usage histogram, date of manufacture, first date of use, and similar information. An example of such a memory device is the DS2502 manufactured by Dallas Semiconductor. Batteries of this construction are also taught in copending application Ser. No. 09/738,090, filed Dec. 15, 2000, entitled "Method and Mechanism to Prevent Corruption of Data", which is incorporated herein by reference in its entirety for all purposes.

The charger 101 includes typical charging circuitry, including a current regulator 113, a power supply connection 114, a current sense resistor 119 and indicator light-emitting diodes (LEDs) 117 and 118. Note that only two LEDs are necessary to indicate three colors, as the red and green illuminated simultaneously gives off a yellow light.

When the battery 102 is placed in the pocket, causing connections 103–106 to close, the thermistor 110 causes the voltage at a first analog to digital (A/D) input 121 to change from Vref to Vref/X, where X is determined by the voltage divider of the pull-up resistor 120 and the thermistor 110. When the first A/D input 121 senses this change, the microprocessor 111 knows that a battery has been inserted into the pocket.

After insertion, the microprocessor 111 identifies the battery 102. This can be done in a variety of ways. One method is to read the memory device 109 via the communication ports 122 of the microprocessor 111. A second method is to determine the value of the coding resistor 108 by sensing the voltage formed by the resistor divider of pull-up resistor 123 and the code resistor 108 through the second A/D input 124. Note that as some older batteries do not include memory devices, a switch 116 is included that performs a multiplexing function allowing the microprocessor 111 to switch between a data communication mode and an analog mode. Essentially, the microprocessor 111 monitors the inputs 122,124 for both digital and analog information.

Once the battery 102 has been identified, the microprocessor reads the memory device 109 to decide if a reconditioning cycle is needed. If so, the microprocessor 111 enables the discharge circuit 112, which may be a simple resistor, to discharge the cell 107. The microprocessor 111 also notifies the user that the cell 107 is being reconditioned by actuating an enunciator, which may include illuminating one or more LEDs 117,118.

If the user decides that he does not want the battery 102 reconditioned, he simply removes the battery 102 from the pocket. This causes the input of the first A/D to go high, and the microprocessor 111 knows that the battery 102 has been removed. The microprocessor 111 then starts a window timer of a predetermined length. When a battery 102 is reinserted prior to the window timer terminating, the microprocessor 111 identifies the battery 102. If it is the same battery 102 that has been removed, the microprocessor 111 then disables the discharge circuit 112 and begins charging the cell 107. The system works vice versa when the microprocessor 111 determines at initial insertion that the cell 107 does not need to be reconditioned.

Other functionality can be added to the system. If one desires to enable the insertion switch for a limited time, a process timer can be added as well. For example, if the designer wants the insertion switch to be enabled only at the beginning of a charge or recondition cycle, a limited process timer may be added at the appropriate point in the cycle. After battery identification, when the recondition or charging process has begun, the microprocessor starts the process timer of a predetermined length. When the battery is removed, the window timer starts. If the battery is reinserted before both the window and process timers have run out, the charger would switch from charge to recondition or recondition to charge. In this manner, the designer could enable the reinsertion switch only for the front end of a cycle.

By way of example, when the charge process begins, the microprocessor starts a process timer that may last 2–3 minutes. When the battery is removed from the charger, the process timer continues to run and the charger microprocessor initiates a second timer that begins to count the recondition window. If the battery is reinserted during the recondition window, and the battery is identified by the microprocessor-memory interrogation described above, then the charger will terminate the current process and begin the opposite process provided the process timer has not run out. If, however, either the recondition window or process timer has expired at reinsertion, the charger would simply continue the charge process.

The same is true if the charger initiates a reconditioning process. If the user removes the battery from the charger and reinserts it prior to the expiration of the recondition window, the charger will switch from the reconditioning process to the charging process, provided the process timer has not expired. The invention allows the user to override the automatic charging process without the need of a separate mechanical switch.

In one preferred embodiment, when a battery is inserted into the charger, the charger microprocessor then interrogates the memory devices in the battery to determine the serial number of the battery for identification purposes. The charger also determines whether the battery is to be charged or reconditioned based upon the stored usage histogram. Depending upon whether the battery is to be charged or reconditioned, the charger begins the appropriate process and indicates to the user which process has begun.

In one preferred embodiment, if the charger initiates the charging process, the charger indicates such by illuminating a red LED. The charger microprocessor also starts a 2.5 minute process timer. If the user removes the battery from the charger, the 2.5 minute timer continues and a 5 second window timer is started.

When the battery is reinserted, the charger microprocessor interrogates the memory in the battery to determine the identification of the battery pack. If it is the same battery as that which was removed, and if the battery is reinserted in the charger within the 5 second window, and if the 2.5 minute timer has not expired, the charger will terminate the charge process and begin the reconditioning process. The charger will appropriately indicate that reconditioning has begun by illuminating a yellow LED. If on the other hand the 5 second window has expired, the charger will simply continue the charging process.

Now to look at the example another way, assume that when the battery is initially inserted and the identification is checked, the charger initiates a reconditioning process. In this event, the charger alerts the user that reconditioning has begun by illuminating a yellow LED. If the user removes the battery, the 5 second window timer begins.

If the battery is reinserted and identified as being the same battery, and the 5 second window has not expired, then the charger will terminate the reconditioning process and begin the charge process. The charger will indicate such by illuminating a red LED.

Figure 2:
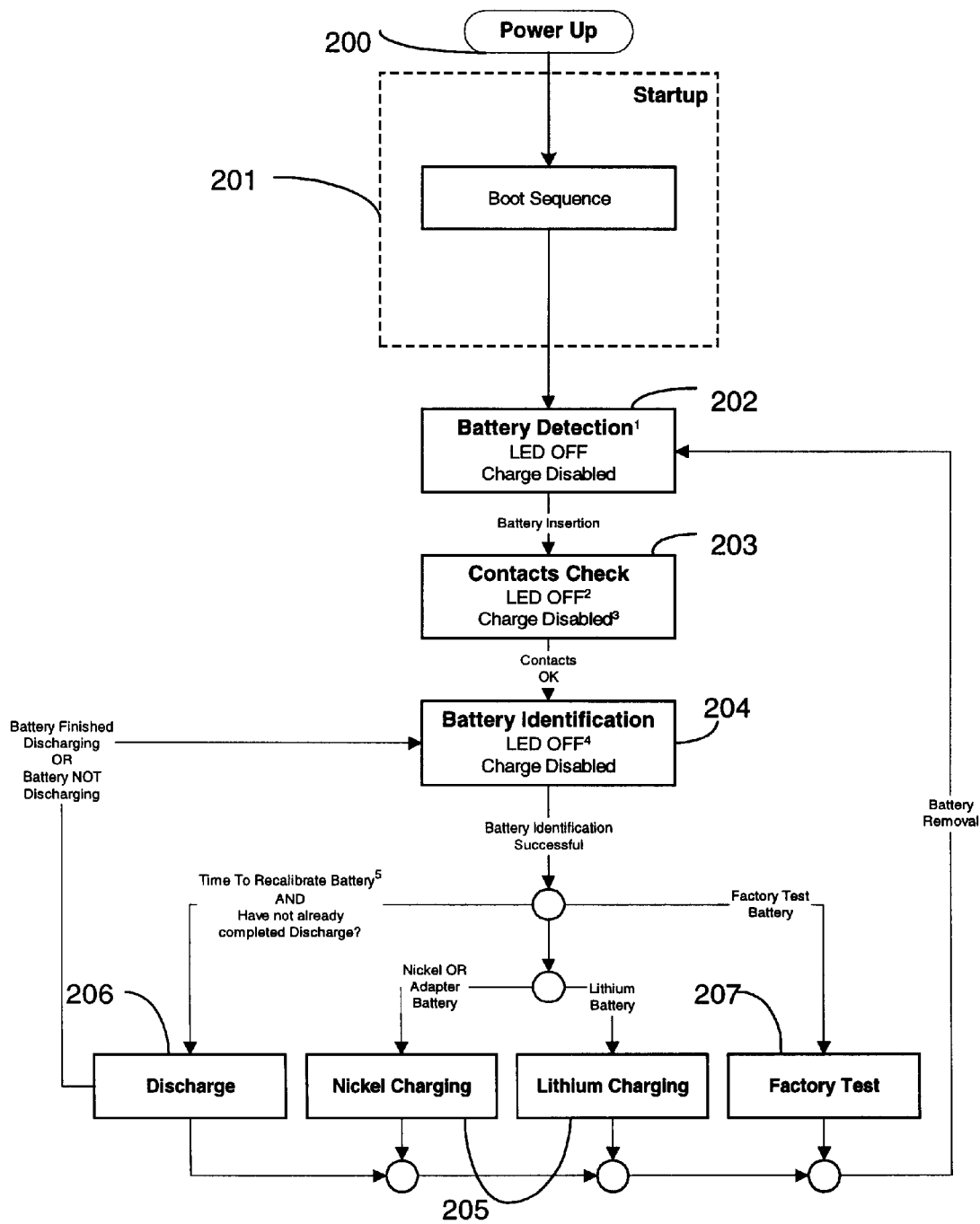
FIG. 2 is a state diagram of a charging algorithm in accordance with the invention.

Referring now to FIG. 2, illustrated therein is a flow diagram illustrating the process. Once the charger is powered up 200, the boot sequence has run 201 the charger begins looking for a battery 202. Once a battery is inserted, the charger checks the contacts 203 and identifies the battery 204. When the battery has been successfully identified, the charger determines whether to charge 205, recondition 206 or test 207 the battery. Removal of the battery causes the associated timers to begin and sends the battery back to the wait for insertion state 202.

While the preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims. For example, while one preferred embodiment has been directed towards charging and reconditioning a battery, it will be clear to those skilled in the art that the invention could be applied to numerous processes, including turning the charger on and off.

Additionally, the insertion switch of this invention could be equally used to initiate any other number of procedures. Instead of reconditioning, the insertion switch could be used to toggle charging modes. For example, by actuating the reinsertion switch, the user may cause the charger to switch from rapid charge to trickle charge; from trickle charge to maintenance charge; from trickle to rapid; from maintenance to trickle; and so on. The insertion switch may also be used to run a diagnostic check, read cell capacity, talk time, and the like.

It will also be recognized that a plurality of functions may be controlled with this insertion switch, using time as an additional dimension. For example, a charger in rapid mode may be toggled to trickle mode by holding the radio out of the charger for two seconds prior to reinsertion, while the charger may be toggled into maintenance mode by holding the radio out of the charger for four seconds prior to reinsertion.

What is claimed is:

1. A battery charger comprising:
   a. a pocket having terminals for receiving at least one battery pack, wherein the at least one battery pack comprises at least one rechargeable cell;
   b. means for charging the at least one battery pack coupled to the terminals;

c. means for discharging the at least one battery pack coupled to the terminals; and d. a microprocessor coupled to the terminals; wherein the microprocessor begins a first process upon insertion into the pocket of the at least one battery pack and starts a timer when the at least one battery pack is removed from the pocket.

2. The battery charger of claim 1, wherein if the at least one battery pack is reinserted into the pocket prior to the expiration of the timer, the microprocessor begins a second process.

3. The battery charger of claim 2, wherein the first process is selected from the group consisting of charging, reconditioning, performing diagnostics, and toggling charging modes of the at least one rechargeable cell.

4. The battery charger of claim 3, wherein the second process is selected from the group consisting of charging, reconditioning, performing diagnostics, and toggling charging modes of the at least one rechargeable cell.

5. The battery charger of claim 4, wherein the at least on battery pack further comprises a memory device.

6. The battery charger of claim 5, wherein the memory device has stored within data relating to information selected from the group consisting of serial number, type of cell, charging instructions, charge usage histogram, date of manufacture, and first date of use.

7. The battery charger of claim 1, wherein the microprocessor starts a second timer when the first process commences.

8. The battery charger of claim 7, wherein if the at least one battery pack is reinserted into the pocket prior to the expiration of both the timer and the second timer, the microprocessor begins a second process.

9. The battery charger of claim 8, wherein the first process is selected from the group consisting of charging, reconditioning, performing diagnostics, and toggling charging modes of the at least one rechargeable cell.

10. The battery charger of claim 9, wherein the second process is selected from the group consisting of charging, reconditioning, performing diagnostics, and toggling charging modes of the at least one rechargeable cell.

11. A method of controlling a battery charger, the method comprising the following steps:

a. providing a battery charger comprising a pocket having electrical contacts for mating to a battery pack, the charger further comprising a microprocessor coupled to the electrical contacts;

b. providing a battery pack comprising a means of identification and at least one rechargeable battery cell;

c. inserting the battery pack into the pocket, wherein the charger begins a first process;

d. removing the battery pack; and e. reinserting the battery pack before a predetermined time has elapsed, causing the charger to begin a second process.

12. The method of claim 11, wherein the first process is selected from the group consisting of charging the at least one rechargeable cell and reconditioning the at least one rechargeable cell.

13. The method of claim 12, wherein the second process first process is selected from the group consisting of charging the at least one rechargeable cell and reconditioning the at least one rechargeable cell.

14. A method of charging a battery, the method comprising the following steps:

a. providing a battery charger comprising a pocket having electrical contacts for mating to a battery pack, the charger further comprising a microprocessor coupled to the electrical contacts;

b. providing a battery pack comprising a means of identification and at least one rechargeable battery cell;

c. detecting the battery pack when it is inserted into the pocket;

d. identifying the battery pack;

e. starting a first process; and f. starting a timer when the battery pack is removed from the pocket.

15. The method of claim 14, further comprising:

a. detecting the battery pack when it is reinserted into the pocket;

b. confirming the identification of the battery pack; and c. terminating the first process and beginning a second process so long as the timer has not expired upon reinsertion of the battery pack.

16. The method of claim 15, wherein the first process is selected from the group consisting of charging the at least one rechargeable cell and reconditioning the at least one rechargeable cell.

17. The method of claim 16, first process is selected from the group consisting of charging the at least one rechargeable cell and reconditioning the at least one rechargeable cell.

* * * * *